June 6, 1967  R. J. RENN  3,323,196
PICKUP DRUM APPARATUS HAVING RESILIENTLY
MOUNTED PICKUP TINES
Filed Nov. 12, 1964

Reynold J. Renn
INVENTOR.

BY Edward Everly Bishop

United States Patent Office 3,323,196
Patented June 6, 1967

3,323,196
PICKUP DRUM APPARATUS HAVING RESILIENTLY MOUNTED PICKUP TINES
Reynold J. Renn, 443 Riverdale Ave., Calgary, Alberta, Canada
Filed Nov. 12, 1964, Ser. No. 410,654
4 Claims. (Cl. 29—121)

This invention relates to a pickup drum assembly having resiliently mounted pickup tines.

Pickup tines in pickup assemblies for swathed grain and the like preferably now are made of nylon or synthetic resin of similar properties and methods of mounting such nylon tines resiliently on a drum have been proposed in prior Canadian Patents Nos. 656,599 to Reynold J. Renn and 676,336 to Walter D. Hofer.

The resilient mounting for the pickup tines disclosed in the above noted patents comprises either a circumferential resilient member surrounding the drum or a resilient bar extending longitudinally of the drum. In both cases the circumferential member and resilient bar have been secured to the exterior of the drum and the pickup tines are arranged to project through the resilient member.

While this does provide a resilient mounting for the pickup tines, such resilient mounting suffers from the disadvantage that the normally smooth exterior of the pickup drum is interrupted. The projecting resilient bar or circumferential member tends to obstruct the grain or other material being picked up with the result that the material quickly becomes wound or caught on the pickup tines.

An additional difficulty is that a considerable quantity of resilient material such as, rubber must be used as a circumferential or longitudinal bar and the cost of resiliently mounting the pickup tines in this manner is considerable.

My invention is designed to overcome the above noted difficulties and to provide an assembly including a pickup drum and pickup tines resiliently mounted therein whereby the exterior of the drum remains as smooth as before and whereby the danger of the material being caught on or wound on the pickup tines is substantially reduced.

The essence of this invention resides in the resilient mounting of pickup tines in a pickup drum whereby each of the pickup tines is provided with a resilient base mounted in a receptacle within the drum. The pickup tines each extend radially from the base through an opening in the longitudinal periphery of the drum.

My construction makes the replacement of broken pickup tines or damage mountings a relatively simple operation.

Figure 1:
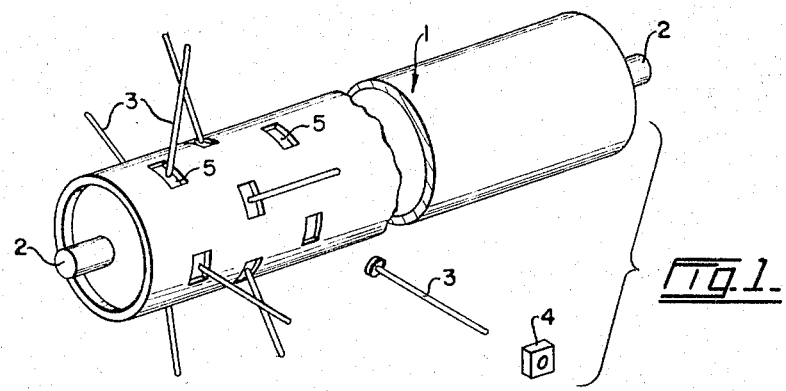
FIGURE 1 is a perspective view of a pickup drum showing pickup tines mounted thereon with one of the pickup tines and its resilient mounting base exploded away from the drum.

In the drawings a pickup drum is indicated generally at 1 and is of usual elongated cylindrical form with stub axles 2—2 at its opopsite ends for rotatable mounting in an agricultural pickup assembly or the like. Pickup tines 3 project radially from the pickup drum 1 and each of the pickup tines 3 is mounted in a resilient base 4 which is seated and secured in a receptacle in register with an opening 5 in the periphery of the pickup drum 1.

The pickup tines 3 each consist of a solid shank of the required length pointed at one end 6, having a head 8 formed at the opposite end.

The resilient bases 4 are, in the preferred embodiment illustrated, rectangular in form although it should be understood that they could be circular or have any other desired shape. The resilient bases 4 are formed with substantially central openings 10 through which the shank of the pickup tine 3 is extended and with a socket 12 in which the head 8 of the pickup tine 3 is seated.

Figure 2:
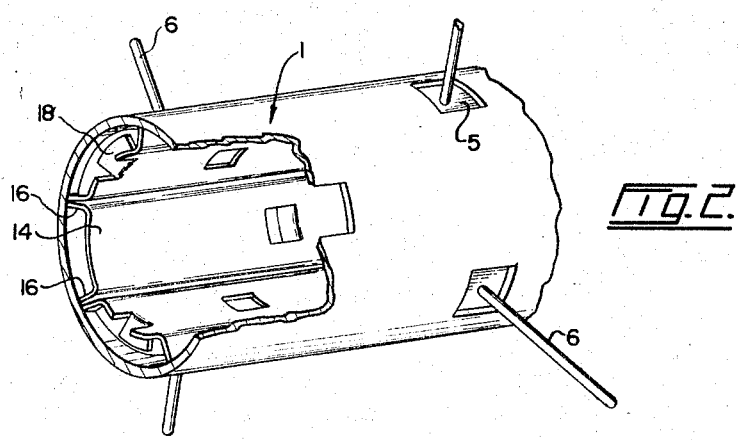
FIGURE 2 is an enlarged broken away perspective view showing a portion of a pickup drum and the receptacles for the resilient bases.
Figure 3:
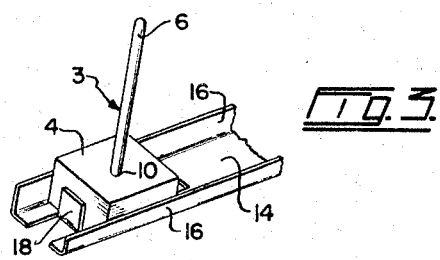
FIGURE 3 is an enlarged broken away detailed view showing the construction of the receptacle with one of the pickup tines mounted therein.
Figure 4:
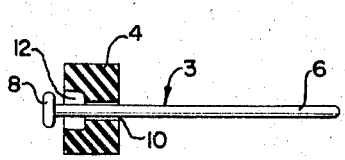
FIGURE 4 is a sectional side elevation showing a pickup tine and resilient base.

FIGURES 2 and 3 illustrate in detail the construction of the pickup drum 1 and the receptacles for mounting the pickup tines 3.

The openings 5 in the periphery of the pickup drum 1 are in rows extending longitudinally of the pickup drum 1 with the openings in the rows being in staggered relationship.

The receptacles to contain and seat the resilient bases 4 are formed below each opening 5 by utilizing U shaped channels 14 which extend longitudinally of the pickup drum 1 and which are secured to its inner periphery by spot welding.

As seen in FIGURE 3 of the drawings, the sides 16 of the U shaped channels 14 will bear against opposite sides of the resilient bases 4 when the said bases 4 are inserted in the said channels 14. The resilient bases 4 are prevented from displacement along the U shaped channels 14 by spaced ears 18 which are punched up from the back of the U shaped channels 14 to bear against the opposite sides of resilient bases 4 when the said bases 4 are seated in the said channels 14.

In actual practice, the U shaped channels 14 are preformed with the ears 18 punched therein to provide receptacles of the correct size to contain resilient bases 4; each said channel 14 is then welded or otherwise secured in position on the inner periphery of the pickup drum 1 with the receptacles in register with the openings 5.

It should be noted that the lateral dimensions of the openings 5 are slightly less than the lateral dimensions of the resilient bases 4 so that the edges of each opening 5 will overlie the resilient member 4. In this manner the resilient bases 4 will be prevented from undesired removal from the said channels 14.

In operation, the pickup drum is assembled with the rows of openings 5 in staggered relationship formed in its periphery. The U shaped channels 14 are secured inside the pickup drum 1 to provide a receptacle in register with each opening 5. The resilient bases 4, having pickup tines 3 inserted therethrough, are then forced through the openings 5 until the said bases 4 are seated in the receptacle.

Since the resilient bases 4 are slightly larger than the openings 5 it is necessary to lubricate the said bases 4 with soap or glycerin prior to their insertion and so that they easily may be forced through the openings 5 into their receptacles. Once through the openings 5, the bases 4 will obviously extend to greater dimension than the openings 5 and the possibility of their being pulled through the openings 5 during normal operation will be eliminated.

If one of the pickup tines 3 or the resilient bases 4 should become damaged or broken, it is merely necessary to apply sufficient force to pull the said tine 3 and base 4 back through the opening 5 whereupon a new pickup tine 3 or resilient base 4 may be inserted.

What I claim as my invention is:

1. A pickup drum assembly comprising, in combination: a pickup drum defining openings in the longitudinal periphery thereof; receptacles disposed within the said pickup drum in register with the said openings; resilient tine bases disposed within the said receptacles; and pickup tines fixed in the said tine bases and projecting radially outwardly through the said openings.

2. The pickup drum assembly as defined in claim 1 in which each said resilient tine base defines an opening therethrough having a socket in its inner end, and each said pickup tine comprises a shank and a head, said head being adapted to seat in said tine base socket and said shank adapted to extend through said tine base opening.

3. A pickup drum assembly comprising, in combination: a pickup drum defining openings in the longitudinal periphery thereof; receptacles disposed within the said pickup drum in register with the said openings; resilient, removable tine bases disposed within the said receptacles, said tine bases being of greater cross section than the cross sections of the said openings so that the edges of the said openings overlap the said tine bases and retain them in the said receptacles; and pickup tines fixed in the said tine bases and projecting radially outwardly through the said openings.

4. The pickup drum apparatus as defined in claims 1, 2 and 3 in which the pickup tines are formed of flexible nylon.

References Cited
UNITED STATES PATENTS

| | | | |
|---|---|---|---|
| 2,150,278 | 3/1939 | Hegenbarth | 29—148.4 |
| 2,965,349 | 12/1960 | Hutton | 248—358 |
| 3,241,216 | 3/1966 | Wellendorf | 29—148.4 |

JOHN F. CAMPBELL, *Primary Examiner.*

THOMAS H. EAGER, *Examiner.*